United States Patent [19]

Hansen

[11] Patent Number: 4,622,644
[45] Date of Patent: Nov. 11, 1986

[54] MAGNETIC POSITION AND ORIENTATION MEASUREMENT SYSTEM

[75] Inventor: Per K. Hansen, Burlington, Vt.

[73] Assignee: Position Orientation Systems, Ltd., Burlington, Vt.

[21] Appl. No.: 609,014

[22] Filed: May 10, 1984

[51] Int. Cl.[4] .............................................. G01B 7/00
[52] U.S. Cl. .................................. 364/559; 324/251; 364/571
[58] Field of Search .............. 364/569, 458, 823, 608, 364/571; 324/207, 251, 247; 128/777

[56] References Cited

U.S. PATENT DOCUMENTS

| | | | |
|---|---|---|---|
| 3,133,244 | 5/1964 | Wojtulewicz | 324/247 |
| 3,189,762 | 6/1965 | Galpin | 324/117.4 |
| 3,408,563 | 9/1968 | Chapman et al. | 324/251 |
| 3,564,402 | 2/1971 | Pittman | 324/247 |
| 3,591,788 | 7/1971 | Brodin | 364/823 X |
| 3,644,825 | 2/1972 | Davis, Jr. et al. | 324/207 X |
| 3,661,089 | 4/1972 | Soltz | 324/251 X |
| 3,737,273 | 3/1973 | Schubert | 364/608 |
| 3,842,419 | 10/1974 | Arndt | 364/458 X |
| 3,906,641 | 9/1975 | Freeman | 324/251 X |
| 4,054,881 | 9/1977 | Raab | 324/227 X |
| 4,099,238 | 7/1978 | Suzuki | 324/251 X |
| 4,109,199 | 8/1978 | Ball et al. | 324/247 X |
| 4,163,326 | 8/1979 | Edwards | 364/559 X |
| 4,197,855 | 4/1980 | Lewin | 364/415 X |
| 4,232,451 | 11/1980 | Thomsen | 318/647 |
| 4,303,077 | 12/1981 | Lewin et al. | 128/777 |
| 4,314,251 | 2/1982 | Raab | 324/247 X |
| 4,371,836 | 2/1983 | Nickel et al. | 128/777 X |
| 4,570,118 | 2/1986 | Tomazak et al. | 324/251 |

Primary Examiner—Errol A. Krass
Assistant Examiner—Danielle Laibowitz
Attorney, Agent, or Firm—Sherman and Shalloway

[57] ABSTRACT

A system is disclosed which enables the measurement of the position and orientation of a permanent magnet within a three dimensional region in five degrees of freedom. In order to sense the position and orientation of the permanent magnet, three three-axis antennas are created with each antenna being composed of three mutually orthogonal Hall-effect devices. As is known, Hall-effect devices produce an output voltage proportional to the product of the input current, the magnet flux density and the sine of the angle between the magnet flux density and the plane of the Hall-effect device. The output voltages from the nine Hall-effect devices utilized in the system are inputted into a microprocessor device which first calculates an estimate of the position and orientation of the magnet utilizing a nonlinearized algorithm. Subsequently, the microprocessor uses a linearized algorithm to calculate the precise position and orientation of the permanent magnet. If desired, and in situations where operation is limited to a restricted area, the system may operate utilizing only six Hall-effect devices deployed as two 3-axis antennas. In one example of a system made in accordance with the present invention, operating in an area of approximately one cubic meter, the location of the permanent magnet was updated approximately 100 times per second and the location of the permanent magnet was determined with an accuracy of better than 0.5% in position and 0.5° in orientation.

13 Claims, 8 Drawing Figures

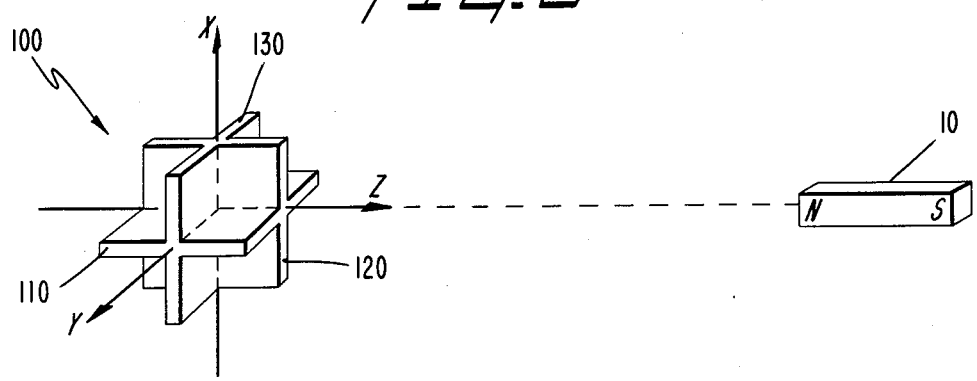
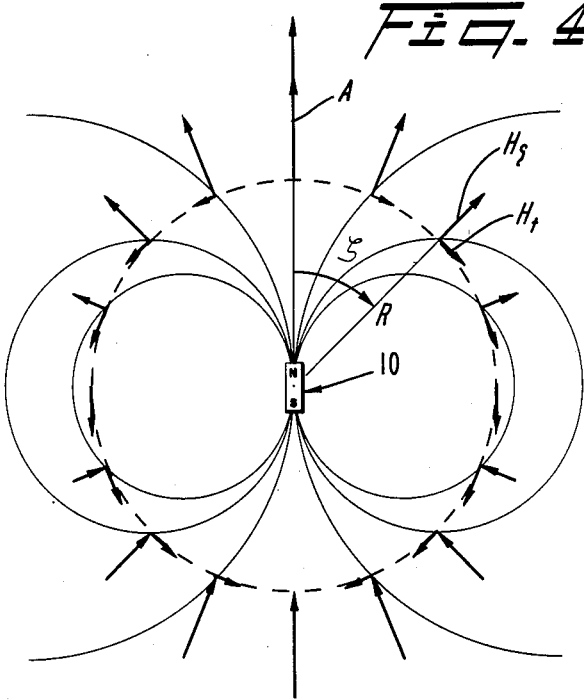
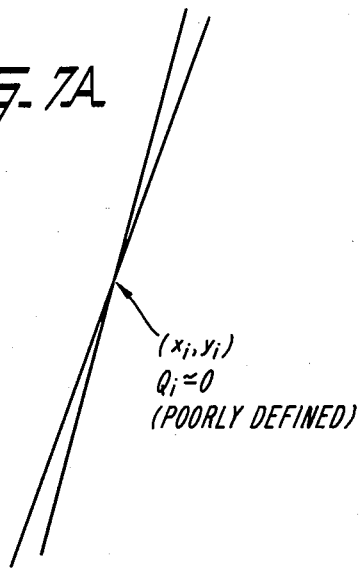
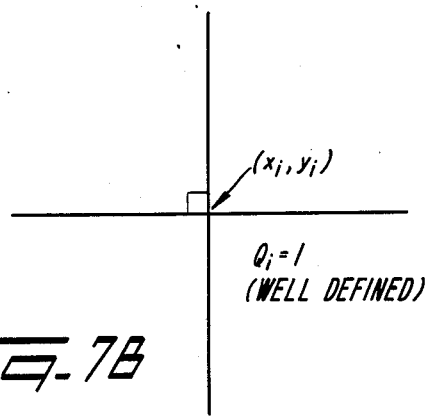

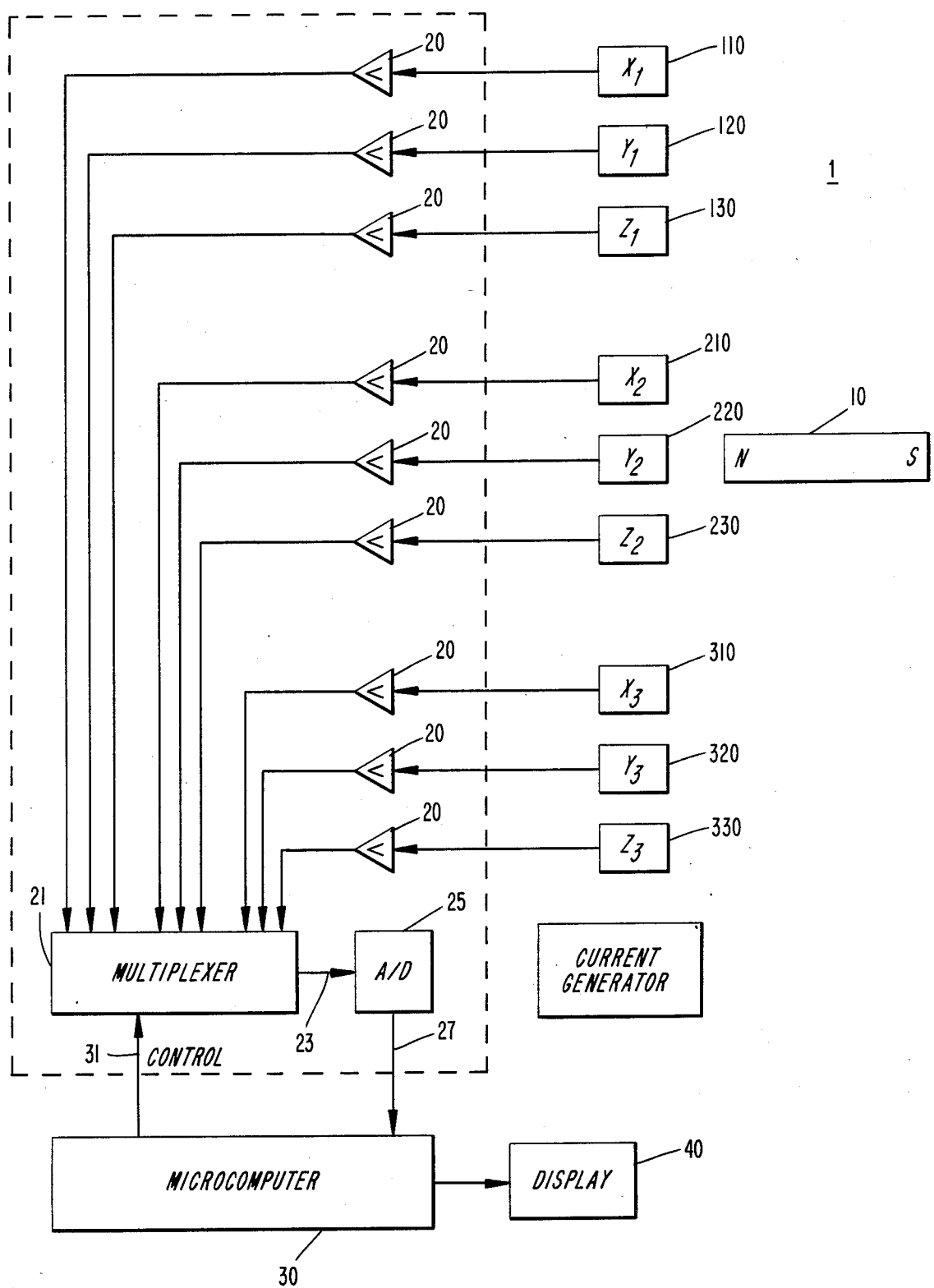

MAGNETIC POSITION AND ORIENTATION MEASUREMENT SYSTEM

BACKGROUND OF THE INVENTION

This invention relates to a magnet position and orientation measurement system. In the prior art, numerous examples are found of systems which use Hall-effect devices for various purposes and which with or without the use of Hall-effect devices attempt to accurately locate an object within a given space. Unfortunately, most of these systems are complicated and extremely expensive and usually require control of both the source and sensor from a microprocessor. Further, no prior art known to applicant discloses an invention which determines both the position and orientation of an object within a given space utilizing a sensor unconnected to the microprocessor and capable of measurement in five degrees of freedom. The following prior art is known to applicant:

U.S. Pat. No. 3,133,244 discloses a three dimensional magnetic detector which includes a cube boss and orthogonal poles extending therefrom. This device is distinct from the present invention for many reasons including the fact that the sensing elements thereof are coils rather than the Hall-effect devices in applicant's invention and further because there is no disclosure therein of the measurement of position and orientation of an object.

U.S. Pat. No. 3,189,762 discloses a three dimensional Hall-effect sensor including orthogonal legs and electrodes. While this device is similar to the three-axis antennas described hereinafter, the disclosure in this patent is merely similar to a subcombination of applicants invention and does not suggest or teach the measurement of position or orientation of an object in a space.

U.S. Pat. No. 3,373,273 discloses in FIG. 2 thereof a Hall-effect body including electrodes on each of its six surfaces. Three coils are provided as magnet means for producing three coordinate magnet components to which the Hall-effect body is subjected. An electrical vector product is generated by the system, however, no position or orientation measurements are made.

U.S. Pat. No. 3,564,402 discloses in FIG. 4 thereof a Hall-effect apparatus for sensing three orthogonal components of a field vector. The field vector is randomly oriented and no position or orientation measurements are made. Further, while the sensing device disclosed therein may be utilized in the system of the present invention, it only comprises a mere subcombination thereof.

U.S. Pat. No. 4,109,199 discloses a three axis magnetometer best seen in FIG. 5 thereof to comprise three mutually orthogonal coils. The main difference between this device and the devices utilized in the system of the present invention comprises the fact that no Hall-effect devices are used but, rather, coils are used. Further, no position or orientation measurements are made.

U.S. Pat. No. 3,591,788 discloses a system which obtains the ordinates of one of two objects, one of which is a ferromagnetic recording medium and the other of which is an electromagnetic pickup head. The electromagnetic pickup head includes a Hall element and the recording medium includes means to detect a second signal on a parallel track. In this device, no position or orientation measurements are made, no three-dimensional sensing device is used and no permanent magnet-type target object is used.

U.S. Pat. No. 3,661,089 discloses an automated vehicle which includes a code reader having Hall-effect devices included therewith which sense the orientation of code magnets to thereby perform tasks based upon signals indicative of such orientation. This system is vastly different from the system disclosed herein and with regard to the sensing of orientation, only two opposed orientations of the code magnets may be determined, and orientations thereof between these two positions are not determined.

U S. Pat. No. 3,644,825 discloses a pair of orthogonally oriented field sensors. The signals received from these sensors are combined vectorally so that the direction of movement and/or relative position of an object may be determined. As illustrated in FIG. 2, the object may include a permanent magnet which creates a magnetic field. There are many differences between this patented invention and the invention disclosed herein, including: (1) only the x,y coordinates of the position of the object are determined; (2) the determination of the position of the object is only made in zones; (3) no orientation measurement of the magnet is made; (4) no Hall-effect devices are used in the system; (5) the system does not use three dimensional magnetic field sensing devices; (6) there is no position finding algorithm which calculates the position as is used in the present invention.

U.S. Pat. No. 3,842,419 discloses a system best shown in FIG. 1 to include a center antenna and two side antennas. An emitter emits an electromagnetic wave and the position of the emitter is calculated by computing the phase difference of signals emitted from the emitter with each antenna comprises a triad. This system is distinctly different from the system disclosed in this patent application especially in that applicant's system produces a magnetic field from a permanent magnet at zero frequency and does not rely upon phase differences to sense position. Further, the patented invention provides no position measurement but rather provides a direction measurement and no orientation measurement in three degrees of freedom is made.

U.S. Pat. No. 4,054,881 discloses three mutually orthogonally radiating antennas each of which transmits electromagnetic radiation to three mutually orthogonal receiving antennas. The receiving antennas measure the radiated signals and produce nine parameters which enable calculation of the position and orientation of the receiving antennas with respect to the transmitting antennas. There are several differences from this patented invention and the invention disclosed herein, including: (1) the present invention utilizes a permanent magnet which generates a magnetic field at zero frequency whereas the patented invention utilizes a transmitted magnetic field at a frequency of 10 kHz; (2) the target in the patented system utilizes amplifiers, filters, a processor and a power supply to generate the transmitted signal whereas the target in the present invention is merely a passive permanent magnet which generates a magnetic field at zero frequency; (3) the patented system utilizes a three-axis transmitter and a three-axis receiver whereas the present invention utilizes a one axis target and two or three three-axis magnetic field sensing devices which are of the Hall-effect type; (4) the algorithms utilized for position and orientation determination are vastly different from one another.

U.S. Pat. No. 4,163,326 discloses the use of two Hall-effect semiconductor devices disposed at right angles to one another. A magnetic field is directed at a particular angle with respect to the Hall-effect devices and this angle may be determined through calculations involving the Hall voltages. This device comprises a compass which is utilized only to measure the direction of earth's magnetic field. This is vastly different from the present invention which compensates for the earth's magnetic field before operations to calculate the position of permanent magnet within a prescribed space begin. Further, the patented invention discloses no determination of the position or orientation of a movable object.

U.S. Pat. No. 4,197,855 discloses a system wherein a permanent magnet is planted, for example, in the human jaw and three orthogonal sensors are provided which are sensitive to the magnetic flux created by the permanent magnet and the system enables calculation of the location and orientation of the magnet. The orthogonal sensors comprise Hall-effect devices. Several differences between this patented system and the present invention are evident as follows: (1) the "permanent magnet" in reality comprises two permanent magnets. In the present invention, a simple permanent magnet rod is utilized; (2) the sensing elements in the patented invention are arrays of Hall-effect devices whereas the present invention utilizes only two or three three-axis magnetic field sensing devices separated by significantly greater distances than the arrays in the patented invention; (3) the patented system requires that the sensing arrays be placed close to the permanent magnet whereas in the present invention, much greater separation is possible; (4) the patented invention requires the use of an extremely large number of Hall-effect devices whereas the system of the present invention utilizes only six or nine Hall-effect devices.

U.S. Pat. No. 4,232,451 discloses a detector which detects the orientation of a rotating magnet. The detector includes a plurality of Hall-elements which detect flux changes representative of orientation of the magnet with respect to the detector. This patent is vastly different from the invention disclosed in this patent application in that the patented invention does not measure the position of the object, only one degree of freedom is measured whereas in the present invention three degrees of freedom are measured and further no three dimensional magnetic field sensing devices are utilized.

U.S. Pat. No. 4,328,548 discloses an invention which detects the position of a source of electromagnetic radiation. Three orthogonal components detect and measure components of the received radiation to enable calculation of the position of the source of the radiation. This system is vastly different from the system disclosed herein for the following reasons (1) the patented system utilizes coils as transmitters and coils as receivers with the respective coils being placed orthogonal to one another; (2) the system requires frequency synthesizers in both the transmitter and the receiver in a signal selection scheme; (3) the system utilizes a time varying electromagnetic field; (4) the transmitter in the patented system which is in essence the target utilizes amplifiers, filters, synthesizers and a power supply whereas the target in the present invention is merely a simple permanent magnet.

The following U.S. Patents are also known to applicants and are believed to be of only general interest: U.S. Pat. Nos. 2,597,125, 2,715,995, 3,002,691, 3,551,649, 3,797,015, 3,851,395, 3,863,257, 4,086,533, 4,229,696, 4,327,498, 4,295,118, and 4,336,596.

The following prior art publications are also known to applicant and are believed to be of only general interest:

"Magnetic Position and Orientation Tracking System" by Raab, et al., IEEE Transactions on Aerospace and Electronic Systems, Volume 15, Number 5, Sept. 1979, is believed to be related to U.S. Pat. No. 4,054,881 to Raab discussed hereinabove and the present invention is believed distinct from this publication for the same reasons discussed regarding U.S. Pat. No. 4,054,881.

Publication "Electromagnetic Retransmission System for Locating Trapped Mine Workers", final report on contract No. H0188071, Polhemus Navigation Systems, Inc. Essex Junction, Vt., Feb., 1980, chapter 1, discloses the use of "Three three-axis sources", however since the systems disclosed all use electromagnetic transmission rather than Hall-effect, this publication is believed to be only generally related to the present invention.

SUMMARY OF THE INVENTION

The present invention overcomes the deficiencies found in prior art devices described above by providing a magnetic position and orientation measurement system including the following features:

(A) a three dimensional space is provided within which the position of an object will be monitored.

(B) a simple bar-type permanent magnet is attached to the object which is to be monitored, with the permanent magnet attached to the object in such a manner that the position and orientation of the permanent magnet will be related in some desired fashion to the position as well as the orientation of the object.

(C) three three-axis Hall-effect devices are installed within the space in predetermined locations. Each of these Hall-effect devices comprises three individual plate-like Hall-effect devices which are connected together in a mutually orthogonal relation.

(D) the output lines extending from the nine Hall-effect devices are connected into a circuit which includes a control circuit, an amplifier, an analog to digital converter, a microcomputer or microprocessor and a display.

(E) the microcomputer or microprocessor is programmed with software enabling it to calculate a nonlinearized algorithm to determine an estimate of the position and orientation of the object.

(F) the data resulting from the calculations of the nonlinearized algorithm may be plugged in to a linearized algorithm to thereby arrive at the true position and orientation of the object.

(G) the system is compensated for the presence of the earth's magnetic field at the location where the system is being used. This compensation is made through adjustments of the circuitry so as to show zero output on each of the Hall-effect sensors when there is no permanent magnet within the predetermined space.

(H) a further compensation may be made if any "metallic scatters" are present. Metallic scatters comprise various objects which may create minute magnetic fields which fields may interfere with the accuracy of the present invention. A compensation routine has been developed in accordance with the present invention which includes the programming into the system of stored tables of field distortion measurements for various objects and this routine is utilized to compensate for any such field distortions. As is known in art, if the distance between the metallic scatter and the source is more than double the distance between the source and the sensor, no field distortion compensation is necessary.

(I) a further compensation may be made in case there is nonorthogonality in any of the three axis sensors. In further explanation, it is possible that the Hall-effect devices have not been assembled in exactly orthogonal relation with one another in any given three axis sensor. Compensation is made by making two measurements in all directions while turning the permanent magnet plus and minus a predetermined amount and by calibrating the sensed signals during this routine to be of the same amplitude regardless of orientation.

(J) when the present invention is used in accordance with the above described criteria, it has been found that the position of the object may be determined to within less than one half percent and the orientation thereof may be determined to within less than one half degree.

(K) one of the most important aspects of the present invention as described herein above lies in the fact that there is no electrical connection between the permanent magnet and the electrical circuitry of the system. In this respect, the system is passive and merely receives data from the Hall-effect devices which data is indicative of the position and orientation of an unconnected permanent magnet based upon the magnetic field created thereby and, from this data, the system determines the position and orientation thereof.

Accordingly it is a first object of the present invention to provide a magnetic position and orientation measurement system enabling the accurate measurement of the position and orientation of an object within a prescribed space.

It is a further object of the present invention to provide such a system which utilizes passive sensing of the position and orientation.

It is a further object of the present invention to provide passive sensing in the form of a permanent magnet attached to the object the position and orientation of which is to be determined with the permanent magnet being unconnected to other circuitry of the system.

It is a still further object of the present invention to determine the position and orientation of an object within a predetermined space by measuring the magnetic fields emanating from the permanent magnet attached thereto.

It is a still further object of the present invention to measure the magnetic field by providing a plurality of Hall-effect sensors which sense the magnetic field and create Hall-effect voltages.

It is a still further object of the present invention that these Hall-effect devices are arranged in the form of two or three three-axis antennas with each such antenna comprising three Hall-effect devices mounted in mutually orthogonal relation.

It is a still further object of the present invention to provide associated electrical circuitry which may receive the Hall voltages from the Hall-effect sensors and from these voltages calculate the position and orientation of the object.

It is a further object of the present invention to program this circuitry with both nonlinearized and linearized algorithms which enable first an estimate of the position and orientation of the object and then a precise determination of the position and orientation of the object within the space.

These and other objects, advantages and aspects of the present invention will become more apparent from the following description thereof when taken in conjunction with the accompanying drawing figures.

BRIEF DESCRIPTION OF THE DRAWINGS

FIG. 3 shows a perspective view of a three-axis Hall-effect antenna, made of three Hall-effect devices according to FIG. 2 mounted in mutually orthogonal relation.

FIG. 4 shows a permanent magnet usable in conjunction with a target object in accordance with the present invention with the magnetic dipole fields thereof shown in detail.

FIG. 5 shows a block diagram of the system shown in FIG. 1 including the associated electrical circuitry.

FIGS. 7A and 7B show respective graphs of the use of a quality factor Q for the determination of intersection of two lines.

SPECIFIC DESCRIPTION OF THE PREFERRED EMBODIMENT

Figure 1:
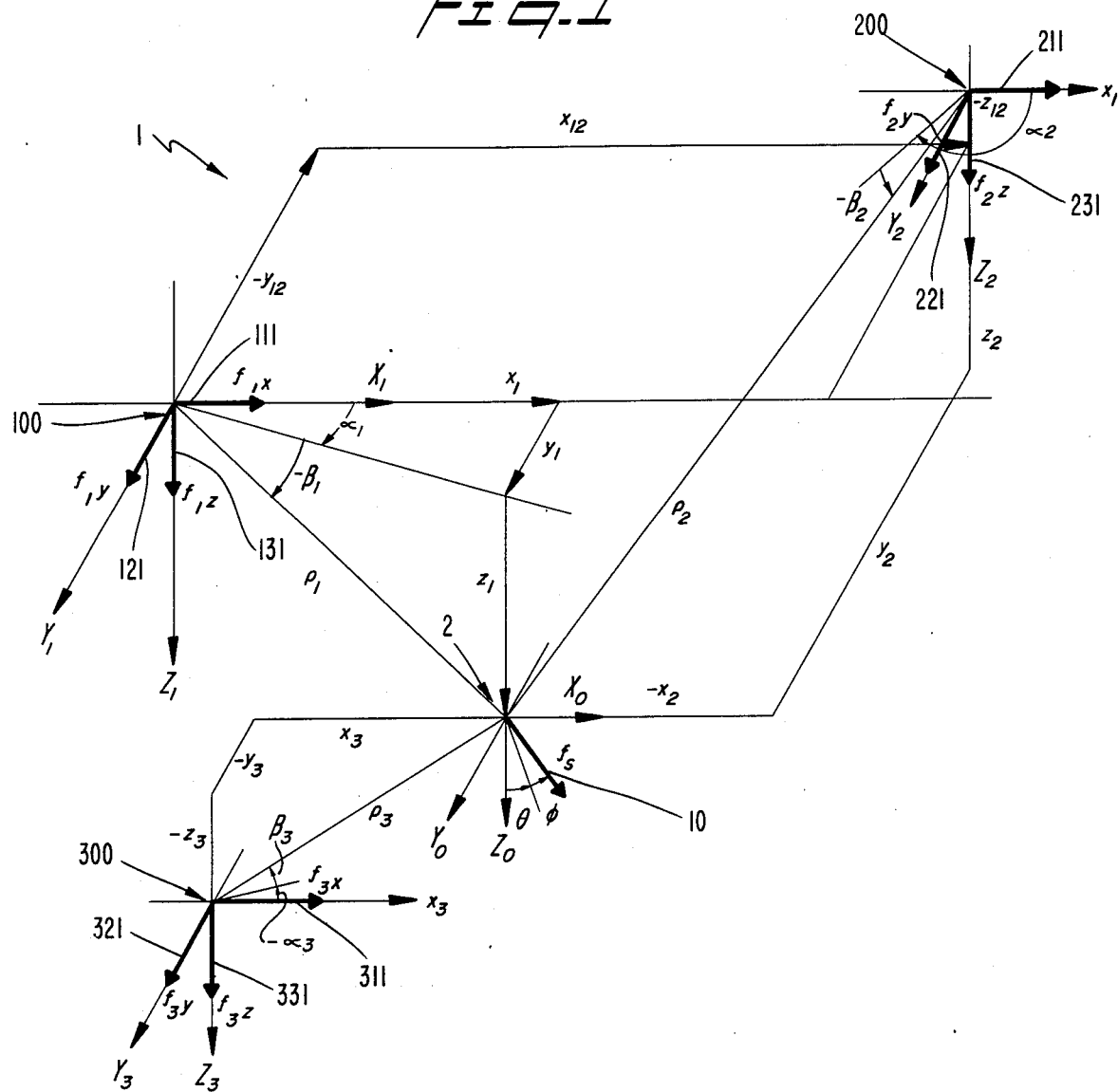
FIG. 1 shows a perspective view of an embodiment of the present invention wherein three three-axis sensors are used in a prescribed space.

Before describing with reference numerals the preferred embodiments, applicant will explain in theoretical fashion the nonlinearized and linearized algorithms which are utilized in calculating, respectively, an estimate of the position and orientation of the target and, precisely, the position and orientation of the target.

THEORY

Figure 2:
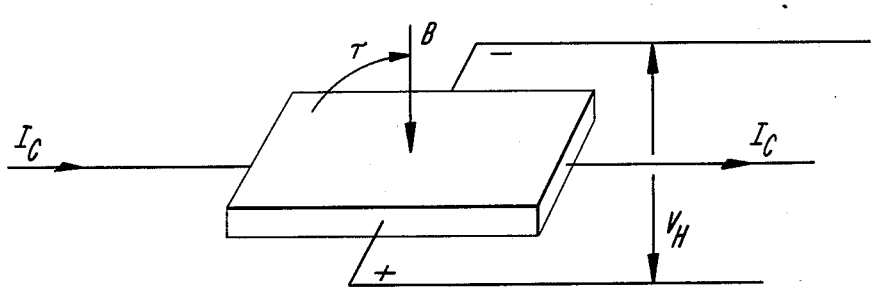
FIG. 2 shows a perspective view of a Hall-effect device.

A Hall-effect device is a four-terminal, solid-state device capable of producing an output voltage, $V_H$, proportional to the product of the input current, $I_C$, the magnetic flux density, B, and the sine of the angle between B and the plane of the Hall-effect device (see FIG. 2).

The output voltage $V_H$, can therefore be found from the equation $$V_H = K_{HOC} I_C B \sin\tau \tag{1}$$

or if $\sin\tau = 1$ (i.e. $\tau = 90$)

$$V_H = K_{HOC} I_C B \text{ or } V_H = \gamma_B B \tag{2}$$

where:
 $V_H$ = Hall output voltage in mV
 $K_{HOC} = \gamma_{IB}$ (open circuit product sensitivity constant in mV/mA KG)
 $\gamma_B$ = magnetic sensitivity (loaded or unloaded) at a specified control current in mV/KG)
 $I_C$ = control current in mA (ac or dc)
 B = Magnetic flux density in kG (ac or dc)

A reversal in the direction of either the magnetic field or the control current will result in a polarity change of $V_H$. A reversal in the direction of both will keep the polarity the same. By holding the control current constant, the Hall voltage may be used to measure magnetic flux density. Multiplication may be accomplished by varying both the control current and the magnetic field.

The Hall-effect devices are used to measure the magnetic flux density in the system. The sensitivity $\gamma_B$ is typically 20 mV/Gauss with a drive current of about 200 mA for high sensitivity Hall-effect devices.

The permanent magnet target produces a magnetic field (the ideal magnetic dipole and free space equations are used), which can be described completely by the radial and the tangential components (See FIG. 4).

$$H_\rho = \frac{M}{2\pi\rho^3} \cos \zeta \text{ (radial component)} \quad (3)$$

$$H_t = \frac{M}{4\pi\rho^3} \sin \zeta, \text{ (tangential component)} \quad (4)$$

where $\zeta$ is the off-axis angle and M is the magnetic moment.

Calculations show that a permanent magent (Alnico 5) with the size 32.5 mm in length and 7 mm in diameter, produces a magnetic field larger than the earth's magnetic field (approximately 0.5 Gauss) at a distance of 1 m. The magnetic flux density can be found from $$B = \mu_o H \quad (5)$$

where $\mu_o = 4\pi 10^{-7}$ is a free space constant.

When the permanent magnet and the Hall-effect device are aligned for maximum sensed signal the voltage detected at the Hall-effect device is $$V_H = C_1 H_\rho \quad (6)$$

where $$C_1 = \mu_o K_{HOC} I_C \sin\tau.$$

The constants were explained hereinabove.

The Hall-effect devices used in the present invention are arranged as three-axis antennas. A typical three-axis antenna is shown in FIG. 3. The antenna has a first Hall-effect device (in the y-z plane) placed for maximum detected Hall voltage with a permanent magnet placed on the x-axis 110, a second Hall-effect device (in the x-z plane) placed for maximum detected Hall voltage with a permanent magnet placed on the y-axis 120, and a third Hall-effect device (in the x-y plane) placed for maximum detected Hall voltage with a permanent magnet placed on the z-axis 130. See FIG. 1 and FIG. 3.

The excitation of the permanent magnet and the resultant fields at a particular location are most conveniently described in vector notation, for example $$\underline{f_1} = \begin{bmatrix} 0 \\ 0 \\ 1 \end{bmatrix} \quad (7)$$

when the permanent magnet is placed along the z-axis. Consider the output of a multi-axis sensor (a three-axis antenna consisting of three Hall-effect devices) of zero orientation ($\theta = \phi = 0$) represented by $\underline{f_o} = [f_{ox}, f_{oy}, f_{oz}[$ with the permanent magnet located along the x-axis. Since the $y_l - y_o$ and $z_l - z_o$ couplings are produced by tangential field components, their amplitudes are reduced by a factor of $-\frac{1}{2}$ from the amplitude $x_l - x_o$ coupling, which results from a radial field.

The coupling can be described completely in vector-matrix form by the equation $$\underline{f_o} = \frac{C}{\rho^3} \begin{bmatrix} 1 & 0 & 0 \\ 0 & -\frac{1}{2} & 0 \\ 0 & 0 & -\frac{1}{2} \end{bmatrix} \underline{f_1} = \frac{C}{\rho^3} \underline{S} \underline{f_1} \quad (8)$$

where $$C = \mu_o K_{HOC} I_C \frac{1}{2\pi}.$$

C is the same for each sensor 100, 200, 300 where the constants K and currents I are the same, and $f_o = [V_{H1}, V_{H2}, V_{H3}]$ comprises the measured Hall-voltages at the three Hall-effect devices in the three-axis antenna (the sensor).

The coupling between the permanent magnet and a Hall-effect device of arbitrary position and orientation can be determined by inserting orthogonal rotation matrices into equation (8). The geometry of the system is shown in FIG. 1. In FIG. 1, the various symbols are defined as follows:

$\rho$: Distance from a sensor (three-axis Hall) to the permanent magnet
$\alpha$: Position azimuth angle
$\beta$: Position elevation angle
$\psi$: Orientation azimuth angle (Yaw) ⎫
$\theta$: Orientation elevation angle (Pitch) ⎬ Notations used for ships and aircraft movement
$\phi$: Orientation roll angle (Roll) ⎭

The subscripts 1, 2 and 3 relate to, respectively, the sensors 100, 200 and 300.

x1, y1 and z1 are rectangular coordinates of the permanent magnet in the coordinate system with origin in sensor 100.

x2, y2, and z2 are rectangular coordinates of the permanent magnet in the coordinate system with origin in sensor 200.

x3, y3 and z3 are rectangular coordinates of the permanent magnet in the coordinate system with origin in sensor 300.

The coordinates x, y, z are set forth in FIG. 1.

These matrices are based upon position azimuth ($\alpha_1$, $\alpha_2$ or $\alpha_3$), position elevation ($\beta_1$, $\beta_2$ or $\beta_3$), orientation elevation ($\theta$), and orientation roll ($\phi$), as shown in Table 1.

TABLE 1

| | Orthogonal Rotation Matrices | |
|---|---|---|
| | Position | Orientation |
| Azimuth Rotates x into y | $T_\alpha = \begin{bmatrix} \cos \alpha & \sin \alpha & 0 \\ -\sin \alpha & \cos \alpha & 0 \\ 0 & 0 & 1 \end{bmatrix}$ | Not applicable |
| Elevation Rotates x into z | $T_\beta = \begin{bmatrix} \cos \beta & 0 & -\sin \beta \\ 0 & 1 & 0 \\ \sin \beta & 0 & \cos \beta \end{bmatrix}$ | $T_\theta = \begin{bmatrix} \cos \theta & 0 & -\sin \theta \\ 0 & 1 & 0 \\ \sin \theta & 0 & \cos \theta \end{bmatrix}$ |
| Roll Rotates y into z | not applicable | $T_\phi = \begin{bmatrix} 1 & 0 & 0 \\ 0 & \cos \phi & \sin \phi \\ 0 & -\sin \phi & \cos \phi \end{bmatrix}$ |

Note that the subscript defines both the type of transformation and its independent variable.

Consider first, for example, the coupling between sensor 100 and a zero-orientation permanent 10 located at $(\alpha_1, \beta_1, \rho_1)$ as shown in FIG. 1. The excitation $f_1$ of an equivalent sensor whose x axis is aligned with the line connecting sensor 100 and the permanent magnet can be determined by rotating the excitation vector of the real sensor by position azimuth and elevation, thus $$\underset{\sim}{f_1} = T_{\beta 1} T_{\alpha 1} \underset{\sim}{f_1}. \tag{9}$$

The output $f'_o$ from similarly aligned equivalent permanent magnet then has the same form as (8), i.e., $$\underset{\sim}{f_o} = (C/\rho_1^3) \underset{\sim}{S} \underset{\sim}{f_1}. \tag{10}$$

The output of the zero-orientation permanent magnet is then found by applying inverse position and orientation rotations, thus $$\underset{\sim}{f_o} = \frac{C}{\rho_1^3} T_{-\alpha 1} T_{-\beta 1} \underset{\sim}{S} T_{\beta 1} T_{\alpha 1} \underset{\sim}{f_1} \tag{11}$$

The couplings between sensor 200 or 300 and a zero-orientation permanent magnet are similarly determined using $(\alpha_2, \beta_2, \rho_2)$ or $(\alpha_3, \beta_3, \rho_3)$.

The output of a permanent magnet of arbitrary orientation $(\theta, \phi)$ is determined by applying orientation elevation and roll rotations to the output of the zero-orientation permanent magnet, thus $$\underset{\sim}{f_s} = T_{100} T_\theta \underset{\sim}{f_o} \tag{12}$$

The above can be combined with equation 11 to show the coupling between a given multiaxis sensor and a permanent magnet of arbitrary orientation; e.g., $$\underset{\sim}{f_s} = \frac{C}{\rho_1^3} T_\phi T_\theta T_{-\alpha 1} T_{-\beta 1} \underset{\sim}{S} T_{\beta 1} T_{\alpha 1} \underset{\sim}{f_1} \tag{13}$$

The equation (13) is used to find the three vector equations for the three three-axis antennas (sensor 100, sensor 200, and sensor 300).

NONLINEARIZED ALGORITHM

The unknown $\psi$ describes the rotation of the magnet around its own axis and is not measurable by the system of the present invention. Since $\psi$ has no real significance, the inability of the present invention to measure it is of no consequence. It is noted that no device is known to applicant which is capable of measuring $\psi$. The parameters $f_1$, $f_2$ and $f_3$ are calculated from the following equations:

$$\underset{\sim}{f_1} = \frac{C}{\rho_1^3} T_\phi T_\theta T_{-\alpha 1} T_{-\beta 1} \underset{\sim}{S} T_{\beta 1} T_{\alpha 1} \begin{bmatrix} 0 \\ 0 \\ 1 \end{bmatrix} \tag{14}$$

$$\underset{\sim}{f_2} = \frac{C}{\rho_2^3} T_\phi T_\theta T_{-\alpha 2} T_{-\beta 2} \underset{\sim}{S} T_{\beta 2} T_{\alpha 2} \begin{bmatrix} 0 \\ 0 \\ 1 \end{bmatrix} \tag{15}$$

$$\underset{\sim}{f_3} = \frac{C}{\rho_3^3} T_\phi T_\theta T_{-\alpha 3} T_{-\beta 3} \underset{\sim}{S} T_{\beta 3} T_{\alpha 3} \begin{bmatrix} 0 \\ 0 \\ 1 \end{bmatrix} \tag{16}$$

where $$T_\beta T_\alpha = \begin{bmatrix} \cos\beta & 0 & -\sin\beta \\ 0 & 1 & 0 \\ \sin\beta & 0 & \cos\beta \end{bmatrix} \begin{bmatrix} \cos\alpha & \sin\alpha & 0 \\ -\sin\alpha & \cos\alpha & 0 \\ 0 & 0 & 1 \end{bmatrix},$$

$$T_\phi T_\theta = \begin{bmatrix} 1 & 0 & 0 \\ 0 & \cos\phi & \sin\phi \\ 0 & -\sin\phi & \cos\phi \end{bmatrix} \begin{bmatrix} \cos\theta & 0 & -\sin\theta \\ 0 & 1 & 0 \\ \sin\theta & 0 & \cos\theta, \end{bmatrix}$$

See also, in this regard, FIG. 1 and the description thereof. $(T_\beta T_\alpha)^{-1} = T_{-\alpha} T_{-\beta}$, and C are determined by the particular permanent magnet being used and the particular Hall-effect devices being used.

A nonlinear algorithm that determines the position unknowns can be derived for the special case of vertical source orientation ($\phi = \theta = 0$). A mininum-variance estimator of small position and orientation differences can be formulated through well-known methods by linearizing the amplitude measurements in the vicinity of a specified position and orientation as will be described hereinafter. Since the values of the orientation angles are expected to be small initially, in most practical application of the system of the present invention, recursive applications of the linearized estimates will produce estimates that converge on the true position and orientation values. In applications, where a completely aribitrary sensor orientation is possible a global search technique can be added if desired as described in the report F. H. Raab and P. K. Hansen, "Electromagnetic Retransmission System for Locating Trapped Mine Workers," Final report on contract no. H0188071, Polhemus Navigation Systems, Inc., Essex Junction Vermont, February 1980.

When $\phi = \theta = 0$ the equations become $$f_{1x} = \frac{C}{\rho_1^3} \left( -\frac{3}{2} \cos\alpha_1 \sin\beta_1 \cos\beta_1 \right) = \frac{C}{\rho_1^5} \frac{3}{2} x_1 z_1, \tag{17}$$

$$f_{1y} = \frac{C}{\rho_1^3} \left( -\frac{3}{2} \sin\alpha_1 \sin\beta_1 \cos\beta_1 \right) = \frac{C}{\rho_1^5} \frac{3}{2} y_1 z_1, \tag{18}$$

$$f_{1z} = \frac{C}{\rho_1^3} (\sin^2\beta_1 - \frac{1}{2} \cos^2\beta_1) = \tag{19}$$

$$\frac{C}{\rho_1^5} \left( -\frac{1}{2} x_1^2 - \frac{1}{2} y_1^2 + z_1^2 \right),$$

$$f_{2x} = \frac{C}{\rho_2^3} \left( -\frac{3}{2} \cos\alpha_2 \sin\beta_2 \cos\beta_2 \right) = \frac{C}{\rho_2^5} \frac{3}{2} x_2 z_2, \tag{20}$$

$$f_{2y} = \frac{C}{\rho_2^3} \left( -\frac{3}{2} \sin\alpha_2 \sin\beta_2 \cos\beta_2 \right) = \frac{C}{\rho_2^5} \frac{3}{2} y_2 z_2, \tag{21}$$

$$f_{2z} = \frac{C}{\rho_2^3} (\sin^2\beta_2 - \frac{1}{2} \cos^2\beta_2) = \tag{22}$$

$$\frac{C}{\rho_2^5} \left( -\frac{1}{2} x_2^2 - \frac{1}{2} y_2^2 + z_2^2 \right),$$

$$f_{3x} = \frac{C}{\rho_3^3} \left( -\frac{3}{2} \cos\alpha_3 \sin\beta_3 \cos\beta_3 \right) = \frac{C}{\rho_2^5} \frac{3}{2} x_3 z_3, \tag{23}$$

-continued $$f_{3y} = \frac{C}{\rho_3{}^3}\left(-\frac{3}{2}\sin\alpha_3\sin\beta_3\cos\beta_3\right) = \frac{C}{\rho_2{}^5}\frac{3}{2}y_3z_3, \quad (24)$$

$$f_{3z} = \frac{C}{\rho_3{}^3}(\sin^2\beta_3 - \frac{1}{2}\cos^2\beta_3) = \quad (25)$$

$$\frac{C}{\rho_2{}^5}\left(-\frac{1}{2}x_3^2 - \frac{1}{2}y_3^2 + z_3^2\right).$$

For further clarification $$f_1 = \begin{bmatrix} f_{1x} \\ f_{1y} \\ f_{1z} \end{bmatrix}$$

Where $f_{1x}$ is the voltage measurement made on the Hall element (x) placed in the y-z plane of sensor 100, $f_{1y}$ is the voltage measurement made on the Hall element (y) placed in the x-z plane of sensor 100, $f_{1z}$ is the voltage measurement made on the Hall element (z) placed in the x-y plane of sensor 100.

$$f_2 = \begin{bmatrix} f_{2x} \\ f_{2y} \\ f_{2z} \end{bmatrix} \text{ and } f_3 = \begin{bmatrix} f_{3x} \\ f_{3y} \\ f_{3z} \end{bmatrix}$$

are the corresponding voltage measurements made for the (x), (y), (z) Hall elements in sensors 200 and 300.

Any equation including the symbol "^" above a symbol is an estimated value. The estimates of the azimuth angles $\hat{\alpha}$ can be found directly from these equations.

$$\hat{\alpha}_1 = \arctan\left(\frac{f_{1y}}{f_{1x}}\right), \quad (26)$$

$$\hat{\alpha}_2 = \arctan\left(\frac{f_{2y}}{f_{2x}}\right), \quad (27)$$

$$\hat{\alpha}_3 = \arctan\left(\frac{f_{3y}}{f_{3x}}\right), \quad (28)$$

The three lines of position determined by the azimuth angles $\hat{\alpha}_1$, $\hat{\alpha}_2$ and $\alpha_3$ do one necessarily intersect at the same point. The estimator therefore determines its final estimate by the weighted sum of the three intersection points of the three lines of position through the following equations $$\hat{x}_1 = \frac{Q_1 x_1' + Q_2 x_2' + Q_3 x_3'}{Q_1 + Q_2 + Q_3}, \quad (29)$$

$$\hat{y}_1 = \frac{Q_1 y_1' + Q_2 y_2' + Q_3 y_3'}{Q_1 + Q_2 + Q_3}, \quad (30)$$

where $(\hat{x}_1', \hat{y}_1')$, $(x_2', y_2')$ and $(x_3', y_3')$ are the same intersect points and $Q_i = \sin^2\gamma_i$ are the quality factors, where $\gamma_i$ are the crossing angles between two position lines.

$\hat{x}_1'$, and $y_1'$ are the calculated intersect points calculated by the estimator. The three calculated intersect points are used to calculate the estimated $\hat{x}_1$, and $\hat{y}_1$.

$Q_i = \sin^2\gamma_i$ is a quality factor for the estimated and calculated intersect point. If $\gamma_i = 90°$, then the intersection point is clearly defined so $Q_i = 1$. If $\gamma_i = 0°$, then the intersection point is poorly defined so $Q_i = 0$.

See in this regard, FIG. 7. When $Q_i = 0$ then the intersection point $x_i'$, $y_i'$ has little weight in the weighted sum estimate. When $Q_i = 1$, then the intersection point $x_i'$, $y_i'$ has maximum weight in the weighted sum estimate. This is commonly used in estimation theory.

When the position estimates $(\hat{x}_1, \hat{y}_1)$ of the zero-orientation sensor are known, the estimate of $\hat{z}_1$ can be found from the equations 17–25 described hereabove.

Consider the equation, where rectangular coordinate formulas are used, $$\frac{f_{1z}}{f_{1x}} = \frac{-\frac{1}{2}x_1^2 - \frac{1}{2}y_1^2 + z_1^2}{\frac{3}{2}x_1 z_1} \quad (31)$$

If neither $x_1 = 0$ nor $z_1 = 0$, substitution of the position estimated $(\hat{x}_1, \hat{y}_1)$ and rearrangement produce $$\hat{z}_1{}^2 + b\hat{z}_1{}^2 + c = 0, \quad (32)$$

where $$b = -\frac{3}{2}\hat{x}_1\frac{f_{1z}}{f_{1x}}$$

and $c = -\frac{1}{2}(\hat{x}_1{}^2 + \hat{y}_1{}^2)$.

The solution of equation 19 is $$\hat{z}_1 = -\frac{1}{2}b \pm \frac{1}{2}(b^2 - 4c)^{-\frac{1}{2}}, \quad (33)$$

where $b^2 - 4c \geq 0$ for all values of the parameters.

The estimate of $\hat{z}_1$ can, except in special cases, be obtained from the measurements of either the x and z axes (P4, P5, P6) or the y and z axes (P7, P8, P9) of the same three-axis sensor. The six resultant estimates are combined linearly to form the initial $\hat{z}_1$ estimate according to $$\hat{z}_1 = \frac{Q_4 \hat{z}_1(P4) + Q_4 \hat{z}_1(P5) + Q_4 \hat{z}_1(P6) + Q_5 \hat{z}_1(P7) + Q_5 \hat{z}_1(P8) + Q_5 \hat{z}_1(P9)}{3Q_4 + 3Q_5} \quad (34)$$

Inspection shows that the quality of an estimate based upon x- and z-axis sensing degrades as $\hat{x}_1$ approaches zero. Similarly, the quality of an estimate based upon y- and z-axis sensing degrades as $\hat{y}_1$ approaches zero. Suitable forms for the quality factors are therefore $$Q_4 = \frac{\hat{x}_1}{1 + \hat{x}_1} \text{ and } Q_5 = \frac{\hat{y}_1}{1 + \hat{y}_1}$$

estimate of $\hat{z}_1$ is easily found directly from the equations 17–25 if $x_1 \approx 0$ and $\hat{y}_1 \approx 0$.

If $\hat{x}_1 = 0$, then $Q_4 = 0$ because the estimate $\hat{z}_1(p4)$, $\hat{z}_2(P5)$ $\hat{z}_3(P6)$ are poorly defined. If $\hat{x} >> 0$, then $Q_4 \approx 1$ because the estimate $\hat{z}_1(P4)$, $\hat{z}_2(P5)$ and $\hat{z}_3(P6)$ are well defined.

$\hat{z}_1(P4)$ is found from $\frac{f_{1z}}{f_{1x}}$ $\hat{z}_1(P5)$ is found from $\frac{f_{2z}}{f_{2x}}$ $\hat{z}_1(P6)$ is found from $\frac{f_{3z}}{f_{3x}}$ $\hat{z}_1(P7)$ is found from $\frac{f_{1z}}{f_{1y}}$ $\hat{z}_1(P8)$ is found from $\frac{f_{2z}}{f_{2y}}$ $\hat{z}_1(P9)$ is found from $\frac{f_{3z}}{f_{3y}}$

LINEARIZED ALGORITHM

The equation relating output voltage to the relative position and orientation can be linearized through the use of a linearized algorithm in the vicinity of the initial position and orientation estimates. The nine linearized equations can then be solved for the differences between the initial position and orientation estimates and the true position and orientation. Recursive application of this linearized solution overcomes the nonlinearities inherent in moderate position and orientation errors. The initial or previous estimates of the position and orientation can be used to compute a set of voltages ($\hat{f}_{1x}$, $\hat{f}_{1y}$, $\hat{f}_{1z}$, $\hat{f}_{2x}$, $\hat{f}_{2y}$, $\hat{f}_{2z}$, $\hat{f}_{3x}$, $\hat{f}_{3y}$, $\hat{f}_{3z}$), that would be produced if the estimates were correct.

The difference between the estimated and the true position and orientation parameters are given by $$\chi = \begin{bmatrix} \Delta f_{1x} \\ \Delta f_{1y} \\ \Delta f_{1z} \\ \Delta f_{2x} \\ \Delta f_{2y} \\ \Delta f_{2z} \\ \Delta f_{3x} \\ \Delta f_{3y} \\ \Delta f_{3z} \end{bmatrix} = \begin{bmatrix} \frac{\partial f_{1x}}{\partial \theta} & \frac{\partial f_{1x}}{\partial \phi} & \frac{\partial f_{1x}}{\partial x} & \frac{\partial f_{1x}}{\partial y} & \frac{\partial f_{1x}}{\partial z} \\ \frac{\partial f_{1y}}{\partial \theta} & \frac{\partial f_{1y}}{\partial \phi} & \frac{\partial f_{1y}}{\partial x} & \frac{\partial f_{1y}}{\partial y} & \frac{\partial f_{1y}}{\partial z} \\ & & & & \\ & & & & \\ & & & & \\ \frac{\partial f_{3z}}{\partial \theta} & \frac{\partial f_{3z}}{\partial \phi} & \frac{\partial f_{3z}}{\partial x} & \frac{\partial f_{3z}}{\partial y} & \frac{\partial f_{3z}}{\partial z} \end{bmatrix} \begin{bmatrix} \Delta \theta \\ \Delta \phi \\ \Delta x \\ \Delta y \\ \Delta z \end{bmatrix} + \underline{n} \quad (35)$$

Where $$\begin{bmatrix} \Delta f_{1x} \\ \Delta f_{1y} \\ \Delta f_{1z} \\ \Delta f_{2x} \\ \Delta f_{2y} \\ \Delta f_{2z} \\ \Delta f_{3x} \\ \Delta f_{3y} \\ \Delta f_{3z} \end{bmatrix} = \begin{bmatrix} f_{1x} - \hat{f}_{1x} \\ f_{1y} - \hat{f}_{1y} \\ f_{1z} - \hat{f}_{1z} \\ f_{2x} - \hat{f}_{2x} \\ f_{2y} - \hat{f}_{2y} \\ f_{2z} - \hat{f}_{2z} \\ f_{3x} - \hat{f}_{3x} \\ f_{3y} - \hat{f}_{3y} \\ f_{3z} - \hat{f}_{3z} \end{bmatrix},$$

$$\begin{bmatrix} \Delta \theta \\ \Delta \phi \\ \Delta x \\ \Delta y \\ \Delta z \end{bmatrix} = \begin{bmatrix} \theta - \hat{\theta} \\ \phi - \hat{\phi} \\ x - \hat{x} \\ y - \hat{y} \\ z - \hat{z} \end{bmatrix}$$

In further clarification, $$\underline{n} = \begin{bmatrix} n1x \\ n1y \\ n1z \\ n2x \\ n2y \\ n2z \\ n3x \\ n3y \\ n3z \end{bmatrix}$$

is a noise error vector where the elements contain the estimated noise for the nine different voltage measurements of the nine Hall effect elements, the noise includes atmospheric noise, room noise and receiver noise.

COMPENSATION

There exist three basic problems using the system of the present invention: (1) the earth's magnet field, (2) field distortion from "metallic scatters" in the environment, and (3) nonorthogonality of the three-axis Hall-effect sensors.

A compensation for the earth's magnetic field is made initially at the place where the system is being used. The system circuitry is calibrated to show zero output of the Hall-effect sensors, without the permanent magnet source deployed.

To compensate for field distortions caused by metallic scatters, a mapping of the sensed magnetic field at the place where the system is being used must be made if many metallic scatters are present. A compensation routine is developed to look-up stored tables of the field distortion measurements and compensate therefore, in the different positions of the source. If the distance between the metallic scatter and the source is more than double the distance between the permanent magnet source and the Hall effect sensors, no field distortion compensation should be necessary.

A further compensation routine is made to compensate for nonorthogonality of the three-axis sensors as assembled. Two measurements are made in all directions by turning the source to $\pm\xi°$ and by calibrating the sensed signal to be of the same amplitude at each extreme of $\pm\xi°$.

DESCRIPTION OF THE PREFERRED EMBODIMENT

With reference now to FIG. 1, the general geometry of the system in accordance with the present invention will be described. As shown in FIG. 1, a space 1 is provided wherein the position and orientation of target 2 will be determined. The target 2 comprises an object (not shown) with a permanent magnet 10 comprising a simple bar-type magnet firmly attached thereto. Within the space 1 are mounted three sensors 100, 200 and 300. Each sensor comprises three Hall-effect devices mounted in mutually orthogonal relation as exemplified by the sensor 100 shown in the schematic FIG. 3. Thus the sensor 100 includes Hall-effect sensor (x) 110, Hall-effect sensor (y) 120 and Hall-effect sensor (z) 130. Similarly, the sensor 200 is comprised of a Hall-effect sensor (x) 210, a Hall-effect sensor (y) 220 and a Hall-effect sensor (z) 230. Similarly, the sensor 300 is comprised of a Hall-effect sensor (x) 310, a Hall-effect sensor(y) 320 and a Hall-effect sensor (z) 330.

The dark arrows in FIG. 1 show the magnetic flux density Bx, By, and Bz emanating from the permanent magnet 10. For sensor 100; $f_{1x}$, 111, is the magnetic flux density perpendicular to the Hall element (x) 110; $f_{1y}$, 121, is the magnetic flux density perpendicular to the Hall element (y) 120; $f_{1z}$, 131 is the magnetic flux density perpendicular to the Hall element (z) 130. For sensor 200; $f_{2x}$, 211, is the magnetic flux density perpendicular to the Hall element (x) 210; $f_{2y}$, 221, in the magnetic flux density perpendicular to the Hall element (y) 220; $f_{2z}$, 231 is the magnetic flux density perpendicular to the Hall element (z) 230. For sensor 300; $f_{3x}$, 311 is the magnetic flux density perpendicular to the Hall element (x) 310, $f_{3y}$, 321 is the magnetic flux density perpendicular to the Hall element (y) 320; $f_{3z}$, 331, is the magnetic flux density perpendicular to the Hall element (z) 330. The Hall elements 110, 120, 130, 210, 220, 230, 310, 320, 330 are not shown in FIG. 1.

In FIG. 1, the angles $\alpha$, $\beta$, $\rho$, $\theta$ and $\phi$ are shown, with some of these angles including subscripts such as 1, 2 or 3. Firstly, it is noted that the subscript 1 relates to angles between the target and the sensor 100, the subscript 2 relates to angles between the target 2 and the sensor 200 and the subscript 3 relates to angles between the target 2 and the sensor 300. With regard to the angles in particular, the angles $\alpha$ relate to the "position azimuth" the angles $\beta$ relate to the "position elevation" the distances $\rho$ relates to the distance between the target 2 and the sensor, the angles $\theta$ relate to the "orientation elevation" of the permanent magnet 10 as attached to the target 2 and the angles $\phi$ relate to the "orientation roll" of the permanent magnet 10 as attached to the target 2.

As explained hereinabove, FIG. 2 shows a single Hall-effect device and explains its operation. With reference now to FIG. 3, the three-axis antenna 100, which is identical to the antennas 200 and 300, is shown. The antenna 100 is comprised of a Hall-effect device (x) 110, a Hall-effect device (y) 120 and a Hall-effect device (z) 130. The permanent magnet 10 which is attached to the target 2 (not shown in FIG. 3) is shown in FIG. 3 to be aligned with the z-axis but this is merely exemplary of the positions and orientations which the magnet 10 may have with respect to the antenna 100.

FIG. 4 shows details of the magnetic field created by the permanent magnet 10. As has been explained hereinabove, the magnetic field includes tangential components designated by $H_t$ and radial components designated by $H_\rho$. As was described hereinabove in conjunction with equations 25–28, the angle $\zeta$ formed between a radius R and the axis A of the permanent magnet 10 is utilized in conjunction with equations 25 and 26 to calculate the radial and tangential maganet field components.

With reference now to FIG. 5, a block diagram of the entire system in accordance with the present invention is shown. The permanent magnet 10 is shown within the space 1 which also contains the sensors 110, 120, 130, 210, 220, 230, 310, 320 and 330. Each of the sensors is connected to a preamplifier 20 which amplifies the Hall voltages received from the sensors to a sufficiently high voltage so that the voltages may be adequately and accurately handled by the multiplexer 21. From the multiplexer, the signals are fed through a line 23 to the analog-to-digital converter 25 which converts the Hall voltages to digital values. When this conversion is completed, these values are then inputted through the line 27 into the micro-computer 30. The micro-computer is programmed with the nonlinearized algorithm and the linearized algorithm described hereinabove, and thus the computer is able to utilize the values inputted thereto from the analog-to-digital converter 25 to thereby perform the calculations required in the nonlinearized equations and then in the linearized equation to arrive at the position in terms of x, y and z coordinates and the orientation in terms of the angles $\theta$ and $\phi$ of the permanent magnet 10 within the space 1. These values are displayed in the display 40 which may be updated if desired faster than 100 times per second. Through the control line 31, the microcomputer 30 may control the multiplexer 21 in a manner enabling the receipt by the micro-computer 30 of signals from the analog to digital converter 25 at the desired rapidity.

As stated herein above, the micro-computer 30 may be programmed so as to enable compensation for (1) the earth's magnetic field, (2) field distortion caused by metallic scatters, and (3) compensation for nonorthogonality of the Hall-effect sensors with respect to one another. These compensation subroutines may be undertaken by the micro-computer 30 and also may be accomplished through adjustments to the preamplifiers 20 and multiplexer 21 in manners well known to those skilled in the art.

Figure 6:
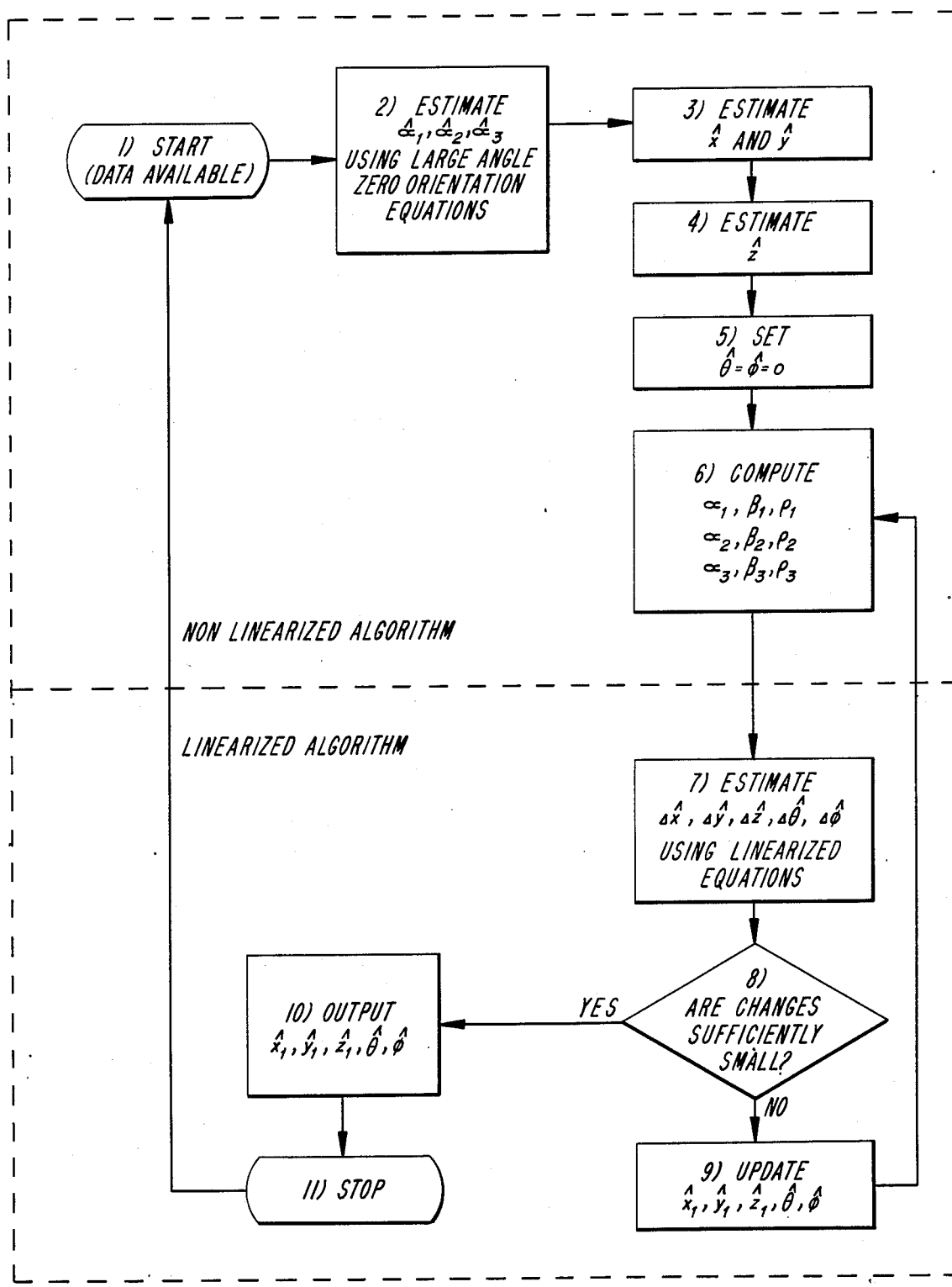
FIG. 6 shows a flow chart for the algorithms utilized in accordance with the present invention in determining the position and orientation of the target object.

FIG. 6 shows a flow chart for the routine which the micro-computer 30 undertakes in calculating the nonlinearized and linearized algorithm. As explained hereinabove, the nonlinearized algorithm was created by applicant in order to enable calculation of estimates of the position of the target object in terms of the coordinates x, y and z and the orientation of the target in terms of the angles $\theta$ and $\phi$. The linearized algorithm was created by applicant in order to utilize the estimates of position and orientation resulting from the calculations of nonlinearized algorithm as inputs to the linearized algorithm in order to find the actual position and orientation of the target object. As explained herein above, the linearized algorithm converges toward the actual position and orientation of the permanent magnet and therefore the target object.

Referring to FIG. 6, the box labeled 1 is indicative of the data which has been received from the Hall-effect sensors via the preamplifiers 20 the multiplexer 21 and the analog-to-digital converter 25. This data is inputted into the microcomputer 30 and box 2 is indicative of equations 26, 27 and 28 which are utilized to calculate $\hat{\alpha}1$, $\hat{\alpha}2$, and $\hat{\alpha}3$. From this data, as noted in box 3, $\hat{x}$ and $\hat{y}$ are estimated as set forth in equations 29 and 30. From these equations, $\hat{z}$ may be estimated as set forth in equations 31, 32, 33 and 34. Box 5 indicates the assumption which must be made in order to perform the calculations of equations 17–25, to wit, $\theta = \phi = 0$. At this point, box 6 indicates that the calculations of the $\alpha$, $\beta$, and $\rho$ are made. From box 6, the flow chart goes to box 7 which is the first box involved in the linearized algorithm. In box 7, equation 22 is calculated to estimate $\delta x$. $\delta y$, $\delta z$, $\delta \theta$, and $\delta \phi$. From box 7, the data arrives at box 8 wherein the micro-computer 30 compares the figures calculated in box 7 with the computer memory wherein is inputted date indicative of how small the changes must be to be sufficiently small. If the changes are not sufficiently small, the flow chart indicates that box 9 updates the figures by reverting back box 6 within the nonlinearized algorithm to repeat the steps 6, 7 and 8. If the changes are sufficiently small, then the data is outputted at box 10 in the form of the display 40 whereupon box 11 indicates a stoppage of function. From box 11, the flow chart indicates that the program restarts at box 1 so that the new position of the target may then be calculated.

Applicant has identified several applications of the present invention. In any application thereof, the analog part of the system may be interfaced directly with any micro, mini or main frame computer via a multiplexer and an analog to digital converter. The computer does all of the controlling and calculating functions therein. The following applications may be considered to be merely exemplary:

(1) the system in accordance with the present invention may be utilized to measure the position and orientation of a target placed on the hand of a person which hand is then moved within the prescribed space.

(2) similarly, the system in accordance with the present invention may be utilized to measure the position and orientation of a target placed on some portion of the human body.

(3) the system in accordance with the present invention may be utilized to measure the position and orientation of a target in a fixed three dimensional space in continuous fashion or in a point by point fashion. In this application, five dimensional drawings of any model may be made with the model placed in a prescribed three dimensional space.

(4) the system in accordance with the present invention may be utilized as five-dimensional input device to utilize in computer-type games. For example, a game could consist of the driving of a vehicle in five-dimensions which may be simulated on the display screen by the movement of the player's hand.

(5) the system in accordance with the present invention may be utilized in monitoring the stresses and vibrations of machines and/or large structures. It may also be utilized in deformation tests of polymeric materials as well as for alignment, angle measurements and bore sighting.

(6) the system in accordance with the present invention may be utilized in communication and control devices as a direct input thereto. It is advantageous to utilize the present invention in this environment since the target is merely passive and only the output device and the display are active.

(7) the system in accordance with the present invention may be utilized in conjunction with a robot which does not need to be preprogrammed. The objects which the robot is to operate on must have a target at the point where the action is to be taken with the system enabling the robot to determine the exact position and orientation of the target so as to enable dynamic interaction therebetween.

(8) the system in accordance with the present invention may be utilized for training and education in any situation where movement of any object or portion of the human body is included in such training and education.

As stated earlier, while the preferred embodiment of the present invention utilizes three three-axis Hall-effect antennas 100, 200 and 300, in a situation where operation is limited to a restricted work area in order to avoid high sensitivity points, the system may include only two three-axis antennas, for example, 100 and 200. The high sensitivity points would be located in a area around a line wherein the known distance $\rho_1 = \rho_2$. It is noted in this regard, that it is probable that three three-axis Hall-effect antennas will be utilized in accordance with the present invention.

Various modifications, alterations, changes and reorientations of the present invention as described hereinabove may become evident to those skilled in the art upon reading of the present disclosure. As such, it is to be stressed that the disclosure herein is intended to merely be exemplary of the preferred embodiments of the present invention and it is further intended that the invention only be limited by the scope of the appended claims.

What is claimed is:

1. A magnetic position and orientation measurement system, comprising:
    (a) a three dimensional space of known dimensions;
    (b) an object located within said space, the position and orientation of which is to be measured;
    (c) a single elongated bar permanent magnet fixedly attached to said object; and
    (d) a plurality of three-axis Hall-effect antennas mounted within said space for sensing the magnetic field of said permanent magnet, each axis of each said antenna being substantially parallel to a corresponding axis of all other ones of said antenna;
    (e) said antennas being connected to electrical circuitry enabling the inputting thereto of data related to the magnetic field of said permanent magnet as sensed by said antennas and therefrom calculating the position and orientation of said permanent magnet and thereby of said object.

2. The system of claim 1, wherein said plurality of antennas comprises three three-axis Hall-effect antennas.

3. The invention of claim 1, wherein each of said antennas comprises three Hall-effect devices mounted together in substantially mutually orthogonal relation.

4. The invention of claim 3, wherein said electrical circuitry includes:
    (a) a preamplifier for each said Hall-effect device, said preamplifiers receiving respective Hall voltages from said Hall-effect devices and amplifying them;
    (b) a multiplexer for receiving the respective amplified voltages from said preamplifiers, and
    (c) an analog-to-digital converter for receiving said amplified voltages from said multiplexer and converting them to digital signals.

5. The invention of claim 4, wherein said electrical circuitry further includes computer means connected to said analog-to-digital converter and programmed to:
    (a) control the flow of signals to and from said multiplexer;
    (b) receive signals from said analog-to-digital converter, and
    (c) calculate from said signals the positon and orientation of said object.

6. The invention of claim 5, further including display means connected to said computer means for displaying data indicative of the position and orientation of said object.

7. A method of measuring the position and orientation of an object, comprising the steps of:
    (a) providing a space of known dimensions;
    (b) locating an object within said space, the position and orientation of which are to be measured;
    (c) attaching a single elongated bar permanent magnet to said object in a known position and orientation with respect to said object;
    (d) locating a plurality of three-axis Hall-effect antennas in predetermined regions within said sapce, each axis of each said antenna being substantially parallel to a corresponding axis of all other ones of said antennas;

(e) measuring the magnetic field of said permanent magnet with said antennas;
(f) inputting data collected from said measuring step into calculating means; and
(g) calculating the position and orientation of said object.

8. The method of claim 7, wherein each of said antennas comprises three Hall-effect devices mounted together in substnatially mutually orthogonal relation.

9. The method of claim 8, further including the step of compensating for any inadvertent non-orthogonalities in said antennas prior to said measuring step.

10. The method of claim 9, wherein said compensating step includes the step of calibrating said calculating means to compensate for said inadvertent non-orthogonalities.

11. The method of claim 9, further including the step of compensating for field distortions caused by metallic scatters by looking up tables stored in said calculating means pertaining to said field distortions and compensating therefor prior to said measuring step.

12. The method of claim 7 further including the step of calibrating said calculating means to compensate for effects of the earth's magnetic field.

13. The method of claim 7, wherein said calculating step further includes the substeps of:
(a) using a nonlinearized algorithm to find an estimate of the position and orientation of said object; and
(b) using a linearized equation system to iteratively find the true position and orientation of said object from said estimate of said position and orientation of said object;
(c) said calculating step requiring no particular starting position and orientation of said object.

* * * * *